(12) United States Patent
Hassan

(10) Patent No.: US 8,434,650 B2
(45) Date of Patent: May 7, 2013

(54) PACKAGING WITH INTEGRAL METERED SERVING DISPENSER MECHANISM

(76) Inventor: Tarek Hassan, Ann Arbor, MI (US)

( * ) Notice: Subject to any disclaimer, the term of this patent is extended or adjusted under 35 U.S.C. 154(b) by 692 days.

(21) Appl. No.: 12/488,913

(22) Filed: Jun. 22, 2009

(65) Prior Publication Data

US 2010/0320236 A1    Dec. 23, 2010

(51) Int. Cl.
*B65D 47/10* (2006.01)
(52) U.S. Cl.
USPC ............. 222/541.7; 222/153.03; 222/344; 222/368; 222/462; 141/362
(58) Field of Classification Search ............ 141/362; 221/266; 222/65, 153.03–153.04, 153.13–153.14, 222/185.1, 288, 293, 305, 339, 344, 367–369, 222/454, 462, 502–503, 541.6–541.8, 564
See application file for complete search history.

(56) References Cited

U.S. PATENT DOCUMENTS

| | | | | |
|---|---|---|---|---|
| 1,183,111 A | * | 5/1916 | Pettermann et al. | 222/144 |
| 2,025,821 A | * | 12/1935 | Nordmarken | 222/368 |
| 2,054,743 A | * | 9/1936 | Fend | 222/368 |
| 2,575,967 A | * | 11/1951 | May | 222/39 |
| 2,881,955 A | * | 4/1959 | Lambert | 222/181.2 |
| 3,850,347 A | * | 11/1974 | Hill | 222/368 |
| 5,038,963 A | * | 8/1991 | Pettengill et al. | 222/145.3 |
| 5,292,037 A | * | 3/1994 | Held | 222/339 |
| 5,947,336 A | * | 9/1999 | Thompson | 222/153.13 |
| 6,029,828 A | * | 2/2000 | Robbins et al. | 211/78 |
| 6,293,440 B1 | * | 9/2001 | Weaver | 222/368 |
| 2006/0027609 A1 | * | 2/2006 | Landau et al. | 222/434 |

* cited by examiner

*Primary Examiner* — Paul R Durand
*Assistant Examiner* — Andrew P Bainbridge
(74) *Attorney, Agent, or Firm* — Gifford, Krass, Sprinkle, Anderson & Citkowski, P.C.

(57) ABSTRACT

A package for flaked and/or granular, consumable material includes a container having a bottom surface and sidewalls that transition through a funnel shape to a dispenser chute terminating in a container opening. A rotating dispenser wheel disposed in the dispenser chute includes a plurality of fillable compartments, and the wheel has a fill position, wherein one of the compartments is filled with contents contained in the enclosure, and a dispense position wherein the contents are released through the package opening following a predetermined rotation of the dispenser wheel. In the preferred embodiment the dispenser wheel has four quadrants defined by panels extending outwardly from a central hub. Two opposing quadrants may define fillable compartments, whereas the other two quadrants may define non-fillable compartments. The dispenser wheel is contained within a holder disposed in the dispenser chute.

2 Claims, 4 Drawing Sheets

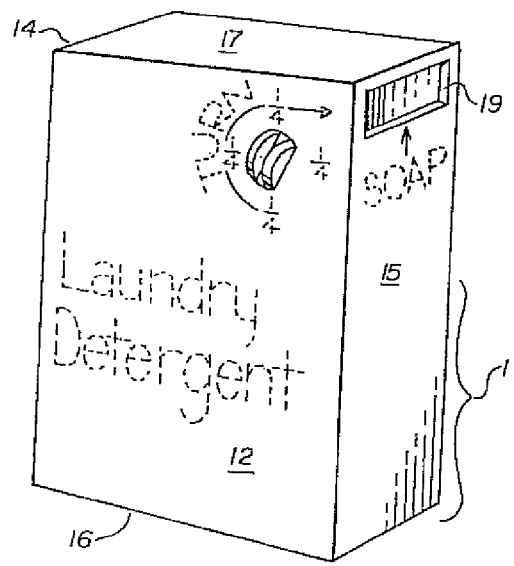
Figure 1 (PRIOR ART)
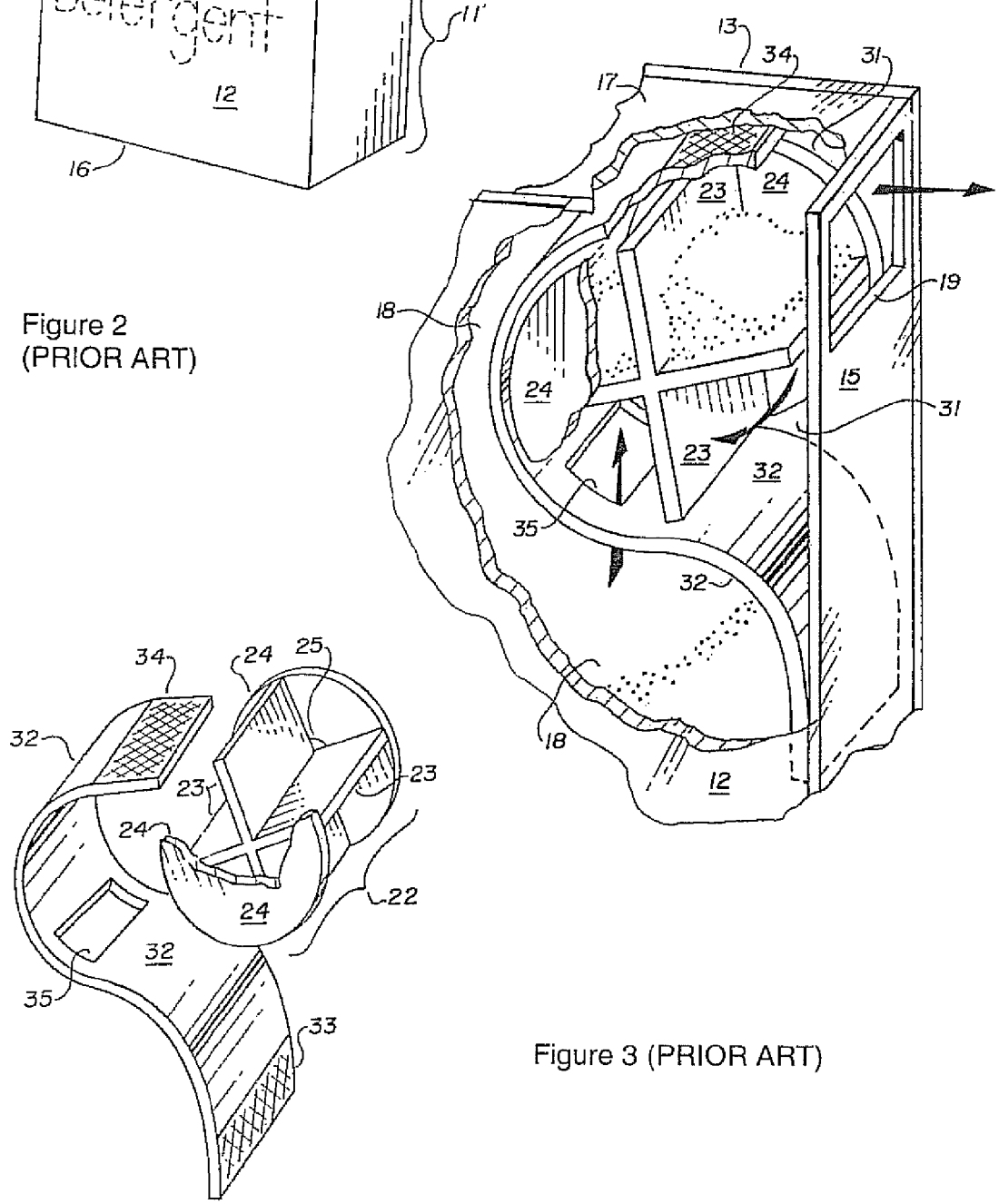
Figure 2 (PRIOR ART)
Figure 3 (PRIOR ART)

PACKAGING WITH INTEGRAL METERED SERVING DISPENSER MECHANISM

FIELD OF THE INVENTION

This invention relates generally to packaging and, in particular, to packaging with an integral mechanism for delivering a predetermined serving of cereal, coffee, sugar, or other substances.

BACKGROUND OF THE INVENTION

Packages for cereal, coffee, sugar and other such small particulate solid substances offer no control over how much material is delivered. As such, children and other individuals may dispense the wrong amount, removing predictability from nutritional or dietary needs, or may spill and waste some of the purchased material. Although scoops are sometimes provided with packages, they can be lost, overfilled or underfilled.

One dispensing package exists, but it is limited to the delivery of laundry detergent. U.S. Pat. No. 3,850,347 describes a dispenser package provided with a customer manually operated mechanical device adapted to scoop up a predetermined and controlled amount of fluent or granular material such as measured quantities of soap powder and deliver the measured quantity of material through a dispenser port opening into a selected container or area.

FIGS. 1-3 illustrate this prior-art apparatus. The preferred embodiment should be incorporated into and would include an overall conventional consumer package 11 which would be of a generally rectangular shape. The dispenser package 11 would have conventional front panel 12, back panel 13, left side panel 14, right side panel 15, bottom panel 16 and top panel 17 enclosing and defining an internal storage compartment 18 for receiving and holding powdered or granular flowable materials such as detergents or soap laundering powder.

At the consumer end the package is opened by tearing away or opening whatever closure material the manufacturer has used to close dispenser port opening 19. The customer will then hold and rotate dispenser package 11 into a downward tilt position such that fluent material from exit port opening 19 will be directed into an open washing machine or other useful container. The customer then employs his thumb and forefinger to rotate tab 28 in such manner as to cause material measuring and carrying scoop paddlewheel 22 to move in a clockwise direction.

The downward tilt position will cause granular or fluent material stored in the internal storage compartment 18 of package 11 to gravity feed flow through sized input port opening 35 in portion measuring housing partition 32 into measuring chamber 31 until it occupies all of the space between two of the adjacent radially spaced apart scoop panels or vanes 23-23 of measuring wheel 22 which quantity of material is programmed to be the amount required for laundering one washing machine load of clothing.

When measuring and carrying scoop paddlewheel 22 had been rotated sufficiently for the loaded compartment to open into and through exit port 19 one measured portion of laundry detergent or other fluent material will have been dispensed. Each subsequent 90 degree rotation will deliver one additional portion of measured fluent material.

SUMMARY OF TEE INVENTION

The present invention improves upon existing packages for flaked and/or granular, consumable materials by providing an inexpensive, easy-to-use manually operated mechanism operative to deliver a predetermined quantity of content.

A package according to the invention includes a container having a bottom surface and sidewalls that transition through a funnel shape to a dispenser chute terminating in a container opening. A rotating dispenser wheel disposed in the dispenser chute includes a plurality of fillable compartments, and the wheel has a fill position, wherein one of the compartments is filled with contents contained in the enclosure, and a dispense position wherein the contents are released through the package opening following a predetermined rotation of the dispenser wheel.

In the preferred embodiment the dispenser wheel has four quadrants defined by panels extending outwardly from a central hub. Two opposing quadrants may define fillable compartments, whereas the other two quadrants may define non-fillable compartments. The dispenser wheel is contained within a holder disposed in the dispenser chute.

The package preferably includes a cover over the opening which is removed by a user to expose the rotating dispenser wheel. The cover may also be used to provide a key used to rotate the wheel. The key may be coupled to the wheel through the wall of the dispenser chute, through a foiled aperture, for example. The compartment is filled with contents based upon a particular serving size or nutritional or dietary needs. For example, the package according to the invention may be used to dispense a "serving" in relation to caloric content or other nutritional information typically printed on the outside of the package.

BRIEF DESCRIPTION OF THE DRAWINGS

FIG. 1 is a perspective view of the exterior appearance of a dispenser package described in U.S. Pat. No. 3,850,347;

FIG. 2 is a partial perspective cut-away view of an upper corner of the prior-art dispenser package of FIG. 1 showing one means by which portion measuring apparatus may be mounted;

FIG. 3 is an exploded view of the rotatable portion metering wheel and housing cover for the metering apparatus of FIG. 2;

DETAILED DESCRIPTION OF THE INVENTION

Figure 4:
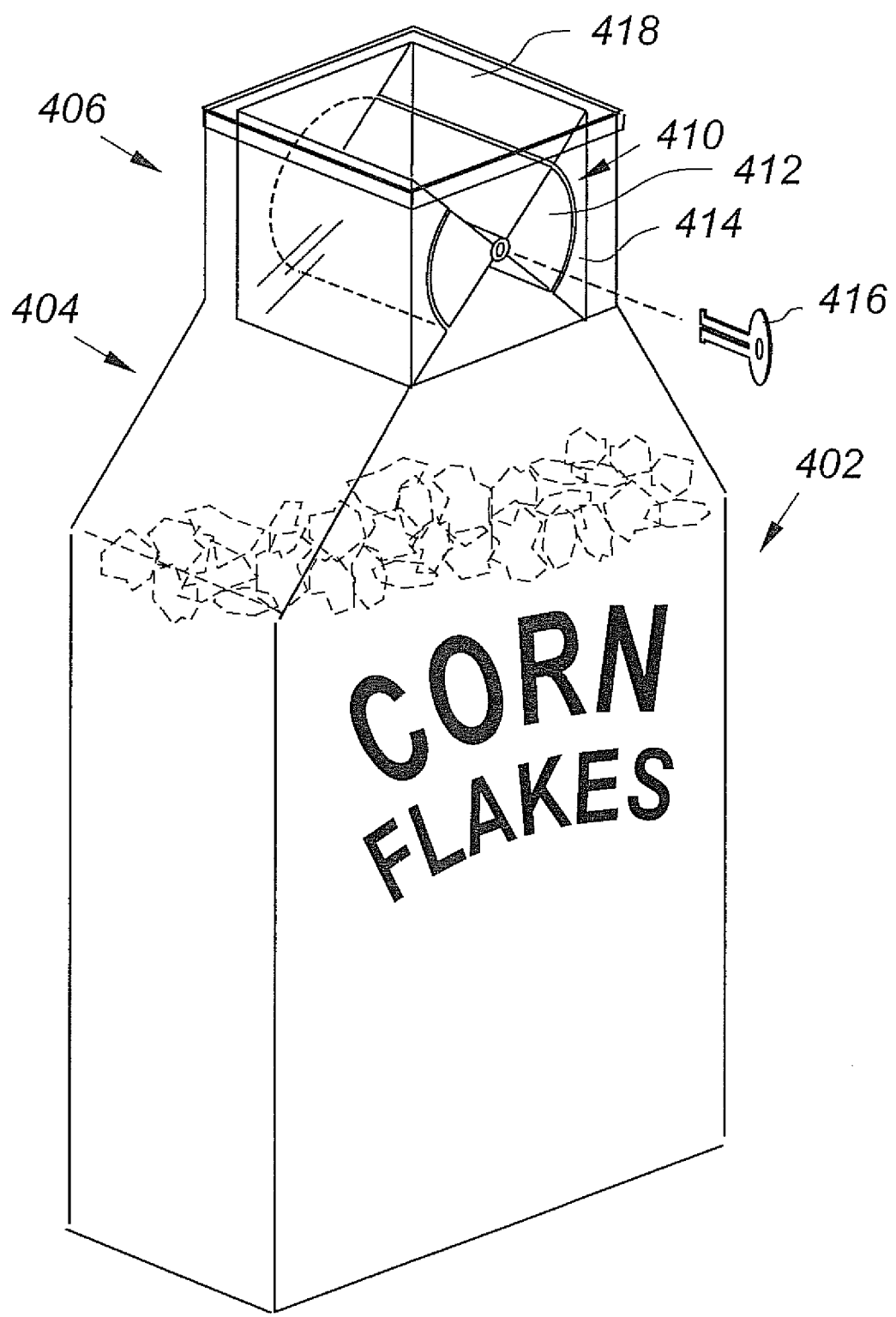
FIG. 4 is a perspective view of a preferred embodiment of the invention.

Having discussed the prior art presented in FIGS. 1-3, the reader's attention is now directed to FIG. 4, a perspective view of the preferred embodiment of the invention.

As seen in the Figure, the invention includes an enclosure 402 adapted to hold flake and/or granular material. Such material may include cereal, coffee, sugar, or the like, with the dimensions of the overall structure being scaled to dispense a particular amount.

The enclosure 402 transitions through a funnel-shaped section 404 to a dispenser chute 406. The enclosure itself may be constructed of any suitable material such as cardboard, waxed paper, plastics, and so forth.

Figure 5:
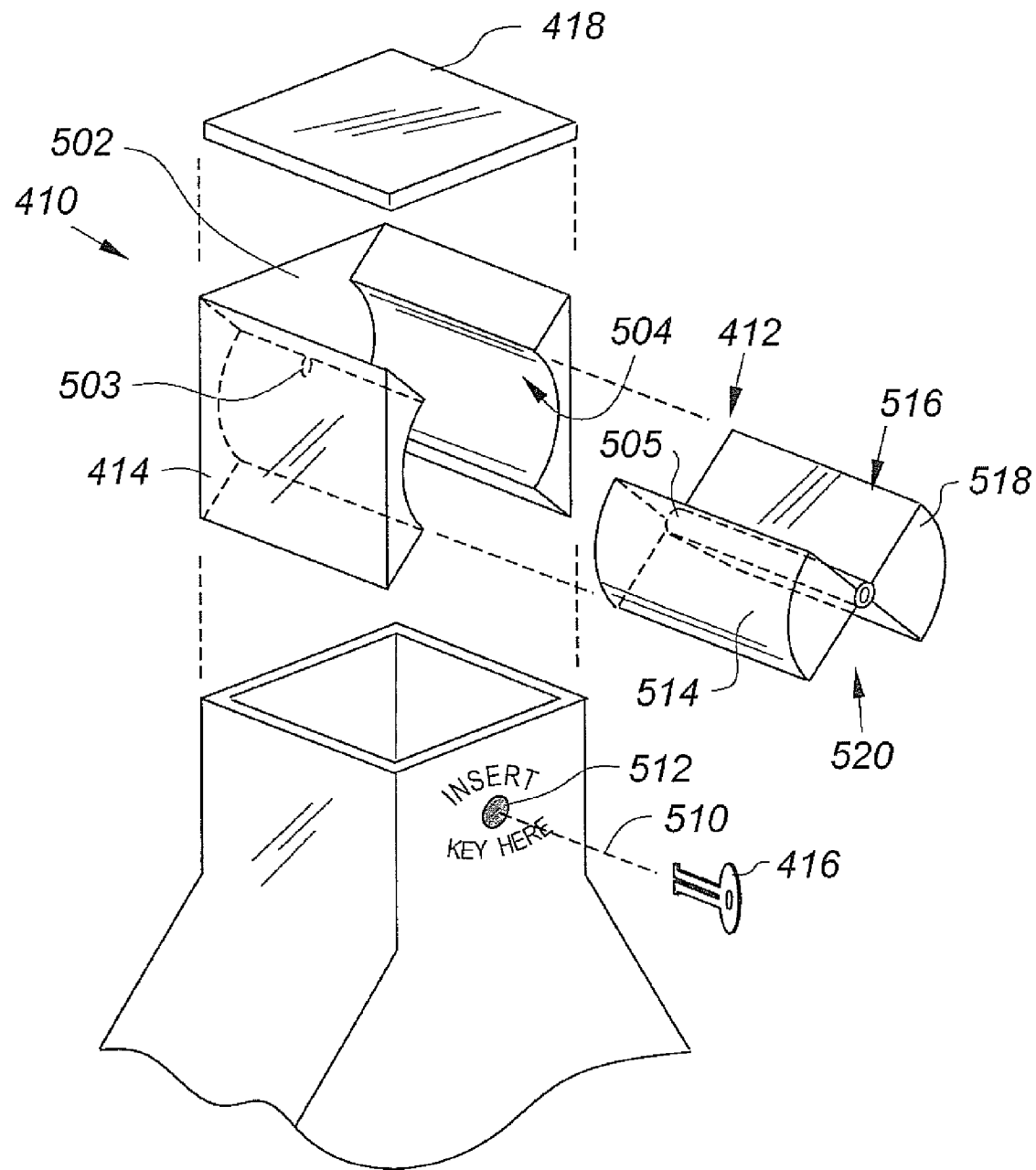
FIG. 5 is an exploded view of the preferred embodiment.

A dispenser mechanism 410 is disposed within the chute portion of the enclosure. As better seen in the exploded view of FIG. 5, the dispenser mechanism 410 includes a holder portion 410 which receives a rotating wheel portion 412. In the interests of economics, both of these portions are constructed of an inexpensive material such as plastic or strengthened cardboard. The holder portion 410 includes a back wall 502, and may include an aperture 503 to receive a pin 505 of the wheel portion 412 to stabilize rotation.

The wheel portion 412 nests within the holder portion 410 as seen in FIG. 4. Once nested, the assembly is glued into the chute assembly and covered with cover 418 which is removed by the consumer. The key 416 used to rotate the wheel portion may be included under the cover 418 and inserted through a foiled aperture 512 and into the central hub of the wheel portion 412. The key 416 preferably includes an elongate handle to show the orientation of the wheel. For example, if the handle is aligned with the chute portion of the container, it means that the wheel is in the fill/dispense orientation as described below. The use of an insertable key ensures that the package is not tampered with until the cover 418 is opened.

Figure 6A:
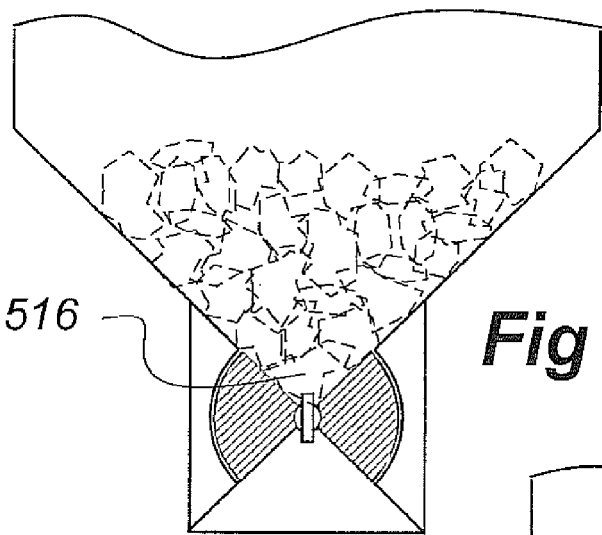
FIG. 6A illustrates a fill position.
Figure 6B:
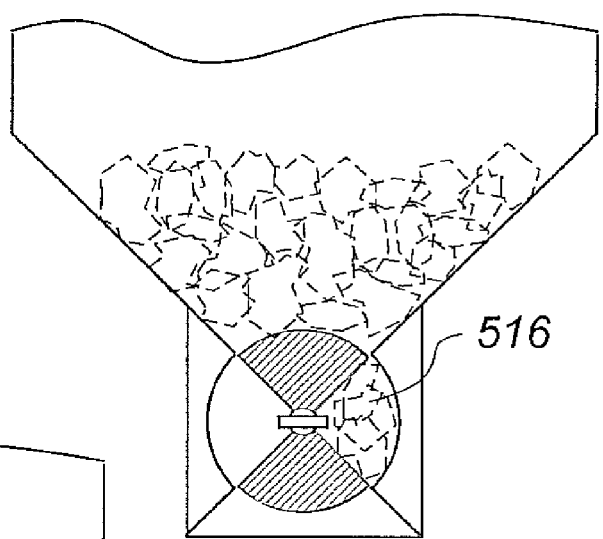
FIG. 6B illustrates an intermediate position.
Figure 6C:
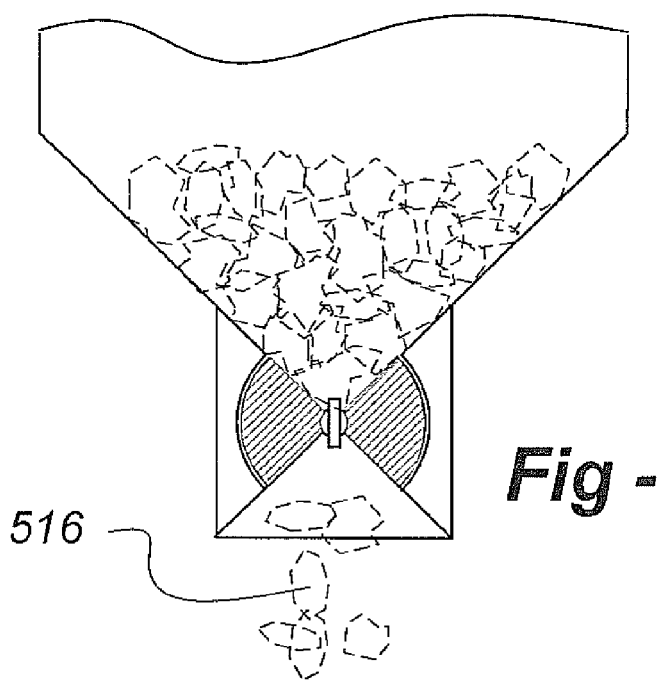
FIG. 6C illustrates a dispense position.

In use, the container is turned upside down as shown in FIG. 6A. This allows the contents to fill chamber 516 as shown. With a turn of approximately 90 degrees, the mechanism assumes the intermediate position of FIG. 6B. With another 90 degree turn, chamber 516 is no facing downwardly, releasing the contents as shown in FIG. 6C.

In the preferred embodiment, the wheel portion has four quadrants defined by fins extending radially outward from the central hub. As perhaps best seen in FIG. 5 two of the quadrants 514, 516 are preferably closed and two of the quadrants are open, providing compartments 516, 520. While in an alternative embodiment all of the quadrants may open into separate compartments, the use of closed quadrants ensures that no container contents are trapped in the fill/dispense positions of FIGS. 6A, 6C. The use of non-fillable quadrants also allows the key 416 to be turned in either direction with the same results.

I claim:

1. A package for dispensing a predetermined amount of content, comprising:
   a container pre-filled with contents to be dispensed;
   the container having a bottom surface and sidewalls that transition through a funnel shape to a dispenser chute terminating in a container opening, the opening being sealed with a cover intended for removal by a user;
   a rotating dispenser wheel disposed in the dispenser chute, the wheel including a plurality of fillable compartments; and wherein the wheel has:
   a fill position, wherein one of the compartments is filled with contents contained in the enclosure, and
   a dispense position wherein the contents are released through the package opening following a predetermined rotation of the dispenser wheel; and
   further including a cover over the opening which is removed by a user to expose the rotating dispenser wheel and to provide a key used to rotate the wheel.

2. A package for dispensing a predetermined amount of content, comprising:
   a container pre-filled with contents to be dispensed;
   the container having a bottom surface and sidewalls that transition through a funnel shape to a dispenser chute terminating in a container opening, the opening being sealed with a cover intended for removal by a user;
   a rotating dispenser wheel disposed in the dispenser chute, the wheel including a plurality of fillable compartments; and wherein the wheel has:
   a fill position, wherein one of the compartments is filled with contents contained in the enclosure, and
   a dispense position wherein the contents are released through the package opening following a predetermined rotation of the dispenser wheel;
   further including a cover over the opening which is removed by a user to expose the rotating dispenser wheel and to provide a key used to rotate the wheel; and
   wherein the key is coupled to the wheel through the wall of the dispenser chute.

\* \* \* \* \*